July 18, 1950     A. N. SPANEL     2,515,806
METHOD OF CONSTRUCTING A UTILITY DEVICE FOR INFANTS
Filed Sept. 16, 1948     4 Sheets-Sheet 1

INVENTOR.
ABRAHAM N. SPANEL.
BY
his ATTORNEYS.

July 18, 1950            A. N. SPANEL            2,515,806
METHOD OF CONSTRUCTING A UTILITY DEVICE FOR INFANTS
Filed Sept. 16, 1948            4 Sheets-Sheet 2
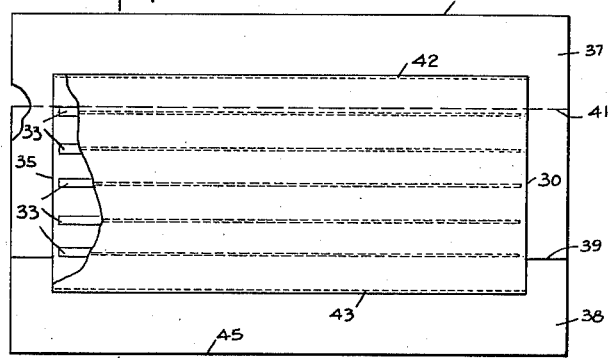
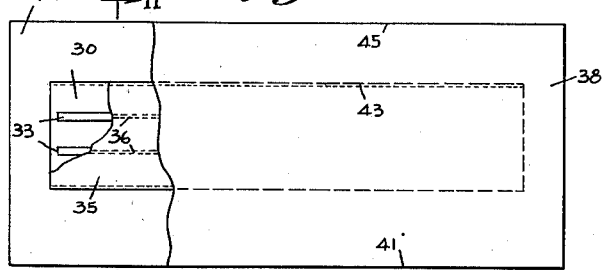
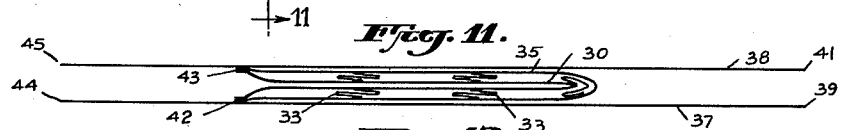
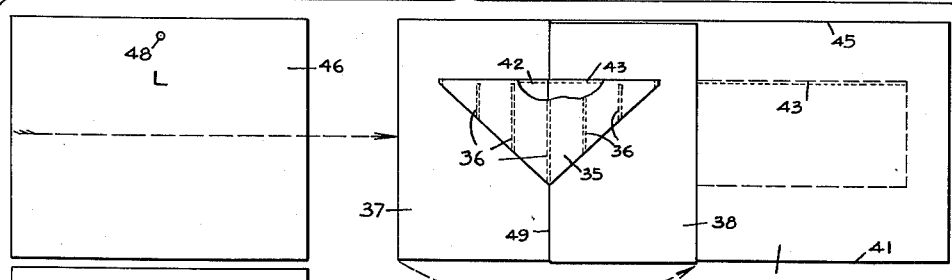
INVENTOR.
ABRAHAM N. SPANEL.
BY *Ward Crosby & Neal*
his ATTORNEYS.

July 18, 1950  A. N. SPANEL  2,515,806
METHOD OF CONSTRUCTING A UTILITY DEVICE FOR INFANTS
Filed Sept. 16, 1948  4 Sheets-Sheet 3
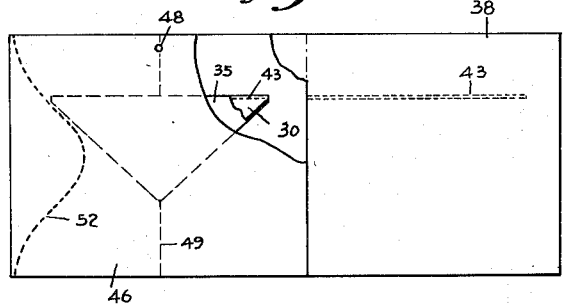
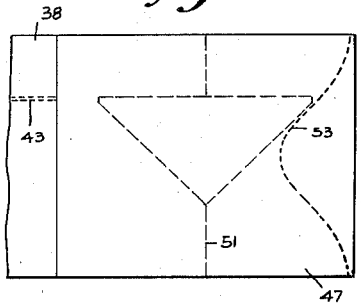
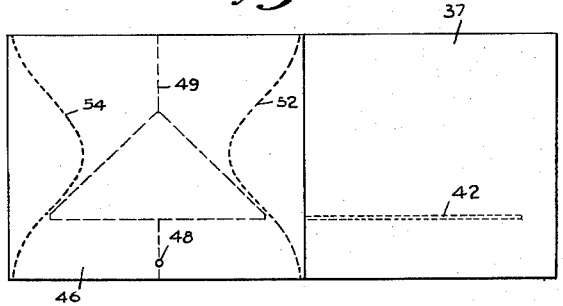
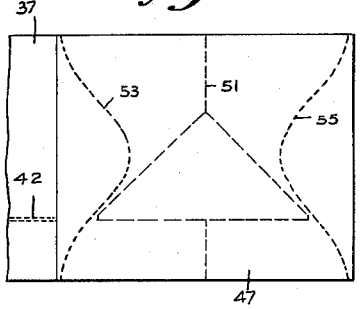
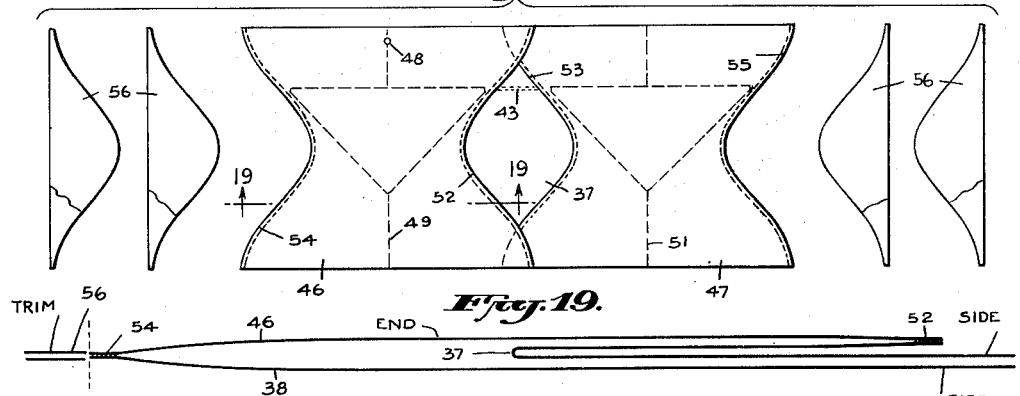
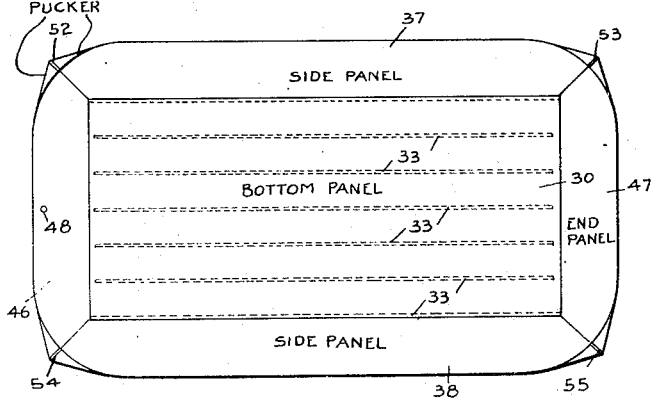
INVENTOR.
ABRAHAM N. SPANEL.
BY Ward Crosby &nesl
his ATTORNEYS.

July 18, 1950      A. N. SPANEL      2,515,806
METHOD OF CONSTRUCTING A UTILITY DEVICE FOR INFANTS
Filed Sept. 16, 1948      4 Sheets-Sheet 4
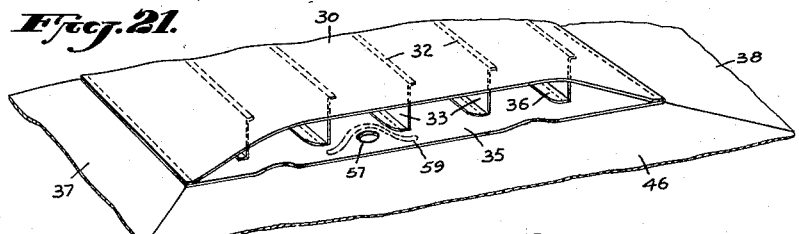
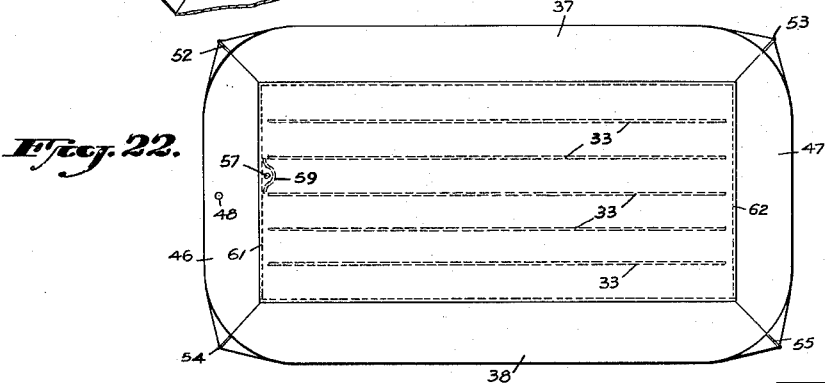
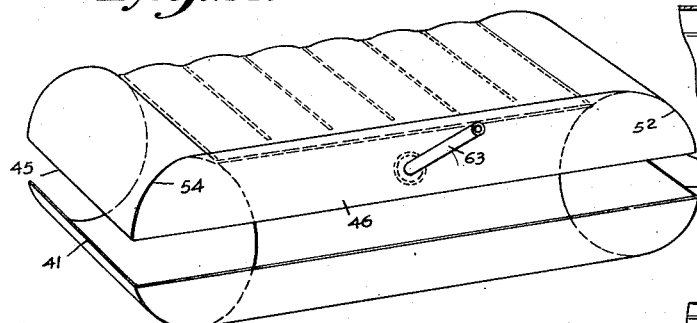
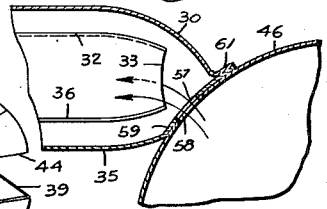
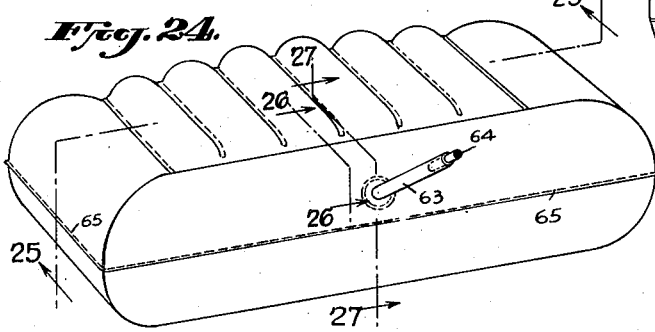
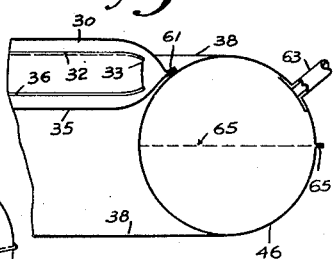
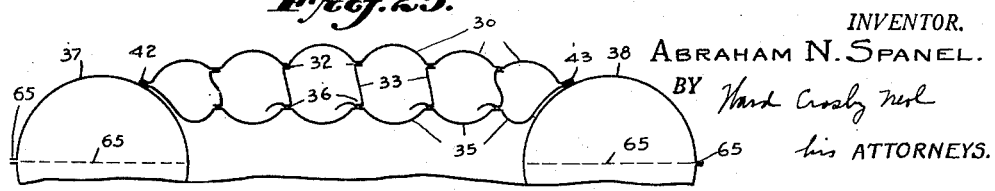
INVENTOR.
ABRAHAM N. SPANEL.
BY his ATTORNEYS.

Patented July 18, 1950

2,515,806

UNITED STATES PATENT OFFICE 2,515,806

METHOD OF CONSTRUCTING A UTILITY DEVICE FOR INFANTS

Abraham N. Spanel, Princeton, N. J.

Application September 16, 1948, Serial No. 49,501

8 Claims. (Cl. 154—85)

This invention relates generally to a method for constructing inflatable devices. The invention is especially useful in constructing an inflatable device of the type disclosed in my copending application entitled "Utility device for infants," Serial No. 783,112, filed October 30, 1947, and hence the embodiment herein described as illustrative of the invention will relate to this special type of device. Certain features disclosed but not claimed herein form the subject matter of said copending application.

An object of the present invention is to provide a new and improved method of constructing an inflatable device.

Another object of the invention is to provide a new and improved method of constructing a device of the character described adapted to economic mass production.

A further object of the invention is to provide a new and improved method of constructing inflatable goods which is simple and efficient in manufacture and which will produce a device durable in use.

Further objects, features and advantages of the invention more clearly will appear from the detailed description given below, taken in connection with the accompanying drawings illustrating a preferred form of the invention and which form a part of this specification.

Referring to the drawings which are arranged progressively in the order in which the steps of my method are carried out:

Fig. 8 is a top plan view of the cushion panel with certain other parts of the device secured thereto to provide side members of a peripheral pneumatic body;

Fig. 9 is a view in cross-section taken along the line 9—9 of Fig. 8;

Fig. 10 is a top plan view showing the manner in which the cushion panel and attached side members are disposed in order to secure additional pieces thereto to provide end members;

Fig. 11 is a cross-sectional view taken along the line 11—11 of Fig. 10;

Figs. 12—18, inclusive, illustrate progressively the manner in which the end members are sealed to the side members;

Fig. 19 is a cross-sectional view taken substantially along the line 19—19 of Fig. 18;

Fig. 20 is a top plan view showing the assembly of the cushion panel and the side and end members;

Fig. 21 is a segmental view in elevation showing the location of a pneumatic opening in the cushion panel;

Fig. 22 is a top plan view also showing the location of the pneumatic opening in the cushion panel;

Fig. 23 is a segmental view of one end in perspective showing the corresponding cooperating edges of the side and end members ready to be joined;

Fig. 24 is a view similar to Fig. 23 showing the side and end members joined by one continuous seal;

Fig. 25 is a cross-sectional view taken along the line 25—25 of Fig. 24;

Fig. 26 is a cross-sectional view taken along the line 26—26 of Fig. 24 and showing the manner in which air is permitted to pass from the peripheral pneumatic body into the cushion panel; and Fig. 27 is a view in cross-section taken substantially along the line 27—27 of Fig. 24.

Figure 1:
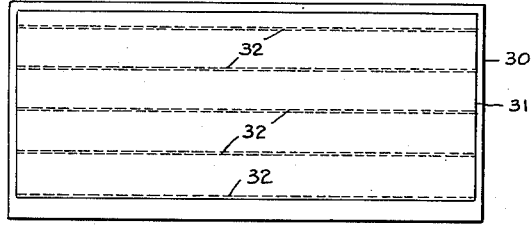
Fig. 1 is a top plan view of a partially assembled panel.
Figure 2:
Fig. 2 is a sectional view taken along the line 2—2 of Fig. 1.

Referring now to the drawings and more particularly to Figs. 1—7, inclusive: 30 designates a sheet of relatively thin, pliable thermoplastic resinous material, such for example as "Vinylite," which is substantially rectangular in form. On top of sheet 30 is placed a second sheet 31 of like material but of slightly smaller dimensions. A plurality of seals, such as 32, are effected between sheets 30 and 31 by any suitable means, such for example as by the simultaneous application of heat and pressure to the two sheets, the seals extending continuously longitudinally of the sheets and beginning along one longitudinal edge of sheet 31 and disposed at spaced intervals transversely thereof (Figs. 1 and 2). The opposite longitudinal edge of sheet 31 remains unsealed.

Figure 3:
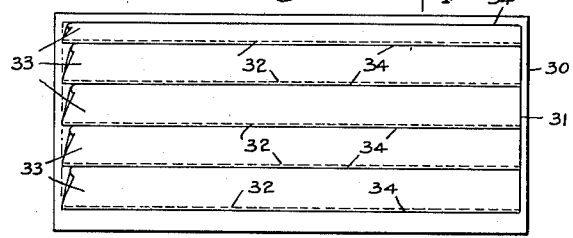
Fig. 3 is a top plan view of said panel showing a further step in its fabrication.
Figure 4:
Fig. 4 is a cross-sectional view taken along the line 4—4 of Fig. 3.
Figure 5:
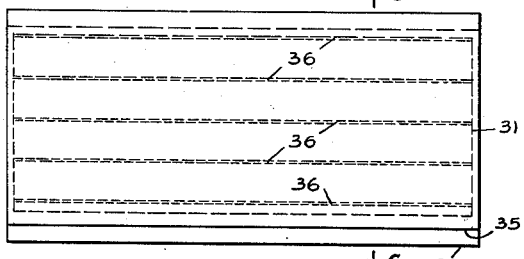
Fig. 5 is a top plan view of said panel showing the formation of series of pneumatic channels in the said panel to provide a cushion panel.
Figure 6:
Fig. 6 is a view in cross-section taken along the line 6—6 of Fig. 5.
Figure 7:
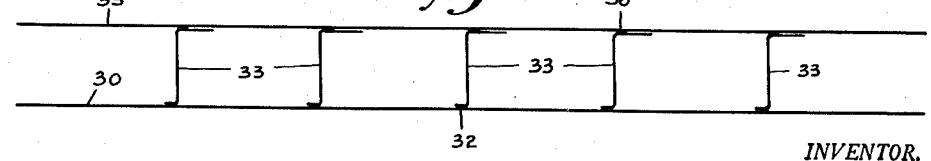
Fig. 7 is a view similar to that of Fig. 6 but showing the cushion panel in a distended condition to better illustrate the relationship of the parts when in use.

The next step in my method is to cut sheet 31 longitudinally thereof intermediate adjacent seal lines whereby a plurality of flaps or partitions, such as 33, are formed having free edges 34 extending from sheet 30, Figs. 3 and 4. A third sheet 35 of "Vinylite" is placed over sheet 30 and partitions 33 and is also substantially rectangular in shape and of the size equal to that of sheet 30 but slightly staggered laterally relative thereto (Fig. 6). A plurality of seals 36 are then effected as by simultaneous application of heat and pressure between the free edges 34 and sheet 35, the seals 36 extending continuously longitudinally of sheet 35 and being spaced apart transversely thereof a distance equal to the distance between seals 32. It will be noticed on reference to Figs. 5 and 6 that while sealing sheet 35 to the free edges 34 sheet 35 is arranged such that the uppermost longitudinal edge thereof extends outwardly from sheet 30. When the sealing is accomplished, however, and the partitions 33 made to stand vertically by air pressure, as in Fig. 7, the longitudinal edges of sheets 30 and 35 become aligned. Thus a cushion panel or member is formed comprising sheets 30 and 35 separated by the partitions 33, the partitions being so spaced as to provide the proper resistance to a compressive force exerted on the cushion member. In accordance with the preferred embodiment of my invention five partitions are constructed which, as will be later shown, provide six longitudinal channels or cells. It will, however, be understood that the number of partitions may be varied if desired.

Additional sheets of "Vinylite" are provided for use as two side members 37 and 38 for the peripheral pneumatic body. These side members are substantially rectangular in shape but are of slightly larger dimensions than sheets 30 and 35. The side members preferably are placed in overlapping relationship to sheet 35 in such a manner that the longitudinal edges 44 and 45 of the side members extend outwardly from the respectively opposite sides of the cushion panel approximately one-third the width of the side member and in this position the inner longitudinal edges 39 and 41 of the side members 37 and 38 respectively will overlap, as shown in Figs. 8 and 9. The side members 37 and 38 are then sealed to sheets 30 and 35 along the longitudinal edges 42 and 43 thereof, respectively.

The side members 37 and 38 are now folded in such a manner that the outer longitudinal edges 44 and 45 thereof and the inner longitudinal edges 39 and 41 thereof coincide respectively, as shown in Figs. 10 and 11. It will be noted that the longitudinal edges 42 and 43 of sheets 30 and 35 also coincide. Referring now to Figs. 12-19, the ends of the uppermost side member 38 are folded back about lines 49 and 51 respectively, as shown in Fig. 12, to produce adjacent portions of the side members of equal size. A pair of substantially square end members 46 and 47 are provided, the end member 46 further being provided with an opening 48 therethrough. The end members are placed over side member 38 in such a manner that opposite edges of the end members coincide with corresponding transverse edges of the side members 37 and 38, as shown in Figs. 14 and 15. A seal is then applied between the outermost transverse edge of each end member and the respectively corresponding oppositely disposed transverse edges of the side member 37, each of these seals being applied along inwardly extending arcuate paths 52 and 53, respectively, beginning at one outer corner of the end member and terminating at the other outer corner thereof (Figs. 14 and 15). In order to seal the opposite edges of the end members to the corresponding transverse edges of side member 38, I find it convenient to fold the complete unit thus formed by folding the unsealed edges of the end members over the sealed ones, turning over the complete unit and then unfolding the sealed edges of the end members along lines 49 and 51, respectively (see Figs. 16 and 17). This method makes it possible to more conveniently apply seals between the end members and side member 38 by avoiding the possibility of accidently sealing together the wrong members. With the unit thus folded the outermost edges of the end members 46 and 47 are sealed to the respectively corresponding transverse edges of side member 38 along inwardly extending arcuate paths 54 and 55 beginning at one outer corner of the end members and terminating at the other outer corner thereof, as seen in Figs. 16 and 17. The next step in my method requires that those portions of the end members 46 and 47 and side members 37 and 38 which protrude outwardly from the arcuate seals be trimmed off. In Fig. 18, the trimmed portions are designated 56.

An opening 57 is provided in sheet 35, as shown in Fig. 21, and an additional opening 58 concentric with opening 39 is provided in end member 46. An arcuate portion of sheet 35 surrounding opening 57 on three sides is then sealed to end member 46 along the line 59. In order to complete the cushion member as a closed pneumatic body the transverse edges of sheet 30 and sheet 35 (Fig. 22) are sealed to corresponding end members 46 and 47 along lines 61 and 62, respectively. It will thus be seen that between the seal line 61 and the adjacent ends of the partitions 33 a header space is provided intermediate the sheets 30—35 (Figs. 21, 22 and 26) into which air may pass through hole 57. An inflating tube 63 is now inserted into the opening 48 previously provided in end member 46 (Fig. 12) and a suitable air valve 64 is inserted within the tube. Corresponding edges of the side and end members are now joined by one continuous peripheral seal 65 (Figs. 23 and 24), which together with the arcuate seals 52, 53, 54 and 55 (see also Fig. 18) provide a uni-cellular pneumatic body of circular cross-section surrounding the cushion member and providing support therefor. The arcuate seals are so formed to produce junctures between the side and end members of substantially circular cross-section thus providing a continuously smooth peripheral pneumatic body. From the foregoing it will be understood that air introduced through the valve 64 and tube 63 will be introduced into the peripheral pneumatic body and through hole 57 into the pneumatic cushion panel to thereby inflate the entire device.

I have found that the strength of the pneumatic cushion panel is materially improved by extending the length of sheet 31 such that the partitions 33 formed thereby will extend into the header intermediate the converging ends of sheets 30 and 35 (Fig. 26), whereby the vertical extent of the partitions is greater at their ends than is the corresponding depth of the pneumatic member itself. This serves to distribute the strain at this point and prevents the panels from tearing away from sheets 30 and 35 at the extremities thereof. It is to be understood that certain features of my invention are useful in which the panel need not be in the form of a pneumatic cushion. In such cases the side members 37 and 38 may be sealed respectively to sheet 30 alone, the remaining steps of my process for constructing and assembling the side and end members being precisely the same as heretofore described.

Having thus described my invention with particularity with reference to the preferred form of the same, and having referred to certain modifications, it will be obvious to those skilled in the art, after understanding my invention, that other changes and modifications may be made therein without departing from the spirit and scope of my invention as defined by the claims appended hereto.

What is claimed as new and desired to be secured by Letters Patent of the United States is:

1. The method of constructing a device of the character disclosed, comprising the steps of joining two sheets with a plurality of strips extending longitudinally therebetween, thereby forming a cushion panel, said plurality of strips being of shorter length than the sheets joined thereby, sealing two opposite longitudinal edges of said cushion panel sheets to two side sheets respectively, sealing two end sheets to the corresponding transverse edges of said side sheets respectively, providing openings in one end of said cushion panel sheets and in the corresponding end sheet to permit the free passage of air through the end sheet and cushion panel sheet simultaneously, sealing the transverse edges of said cushion panel to the corresponding end sheets, and sealing together the corresponding edges of said side and end sheets, whereby a peripheral pneumatic body is formed which supports said cushion panel.

2. The method of constructing a cushion panel for a device of the character disclosed, which comprises the steps of placing a sheet of flexible impervious material on top of a second sheet of like material, said second sheet being of slightly larger dimensions than said first sheet, effecting a plurality of seals between said first and second sheets and extending longitudinally thereof, said plurality of seals being spaced apart transversely of said sheets, cutting said first sheet lengthwise of said seals and intermediate respectively adjacent seals thereby to form flaps having free edges extending from said second sheet, placing on top of said flaps a third sheet of flexible air impervious material of a size equal to that of said second sheet, and sealing the free edges of said flaps to said third sheet at intervals transversely thereof, thereby forming a series of pneumatic channels between said second and third sheets.

3. The method of constructing a device of the character disclosed comprising the steps of forming a plurality of airtight channels arranged in parallel longitudinal alignment between upper and lower members, the opposite extremities of said plurality of channels being spaced inwardly from the opposite extremities of said upper and lower members, sealing two side members to the longitudinal edges of said upper and lower members respectively, sealing two end members to the corresponding transverse edges of said side members respectively, providing openings in one end of said lower member and in the corresponding end member, and sealing together the corresponding edges of said side and end members, whereby a peripheral pneumatic body is formed which supports said cushion member.

4. The method of constructing a device of the character disclosed, which comprises the steps of placing a sheet of impervious material on top of a second sheet of like material, said second sheet being of slightly larger dimensions than said first sheet, effecting a plurality of lines seals between said first and second sheets and extending longitudinally thereof, said plurality of seals being spaced apart transversely of said first and second sheets, cutting said first sheet lengthwise of said seals and intermediate respectively adjacent seals thereby forming flaps having free edges extending from said second sheet, placing a third sheet of like material of a size equal to that of said second sheet on top of said flaps, sealing the flaps to said third sheet at intervals transversely thereof, thereby to form a cushion panel, sealing fourth and fifth sheets respectively to the corresponding longitudinal edges of said second and third sheets along a line extending longitudinally thereof to provide side members for a peripheral pneumatic body and arranged such that the edges of said side member sheets extend beyond the edges of the cushion panel, sealing sixth and seventh sheets to the corresponding transverse edges of said side members respectively to provide end members for a peripheral pneumatic body, the seals between the end and side members being effected along inwardly extending arcuate paths, said side members and said end members forming the walls of a peripheral pneumatic body for supporting said cushion panel, trimming off those portions of the side and end members extending outwardly from the arcuate seals, providing an opening in said cushion panel and in said peripheral supporting member for the free passage of air therethrough, sealing the transverse edges of said cushion panel to said end members respectively, and sealing together the corresponding edges of said side and end members to close said wall and thereby complete said peripheral pneumatic body.

5. A method of constructing a peripheral pneumatic body for a device of the character disclosed having a cushion panel and comprising the steps of sealing a pair of side members to the respective longitudinal edges of said cushion panel, sealing the opposite edges of a pair of end members to the respectively corresponding transverse edges of said side members, the seals between the end and side members being applied along inwardly extending arcuate paths, said end and side members forming said peripheral pneumatic body for supporting the cushion panel, trimming off those portions of the side and end members which extend outwardly from the arcuate seals, providing openings in said peripheral body for the passage of air into said body and said cushion panel simultaneously, and joining together the corresponding edges of said end and side members with a continuous seal.

6. A method of constructing a device of the character disclosed comprising the steps of joining upper and lower sheets with a plurality of strips extending longitudinally therebetween, said plurality of strips being of shorter length than the sheets joined thereby thus forming a cushion panel, sealing side members to the longitudinal edges of said cushion member respectively, sealing opposite edges of an end member to the respectively corresponding transverse edges of said side members, the seals between the end and side members being applied along inwardly extending arcuate paths, sealing opposite edges of another end member to the corresponding transverse edges of said side members respectively, the seals between the other end member and the side members being applied along inwardly extending arcuate paths, trimming off those portions of said end and side members which protrude outwardly from said arcuate seals, sealing the transverse edges of said cushion panel to the corresponding end members respectively, sealing corresponding edges of said side and end members, thereby providing a peripheral pneumatic body, and providing openings in said cushion panel and said peripheral body for the free passage of air through the peripheral body and into the cushion panel.

7. The method of securing an end member to a device of the character disclosed having a cushion panel and side members respectively sealed to the longitudinal edges of the cushion panel, which comprises the steps of folding said cushion panel and said side members such that the corresponding longitudinal edges of the side members coincide, folding back one transverse edge of the uppermost side member to a point located substantially one-half the length of the side member, placing an end member over said side members in such a manner that opposite edges of the end member respectively coincide with the folded edge of said uppermost side member and the unfolded corresponding edge of the lowermost side member, effecting a seal between said end member and said unfolded edge of the lowermost side member, said seal beginning at one outermost corner of the end member and being applied along an inwardly extending arcuate path terminating at the other outermost corner of the end member, folding the unsealed edge of said end member to coincide with the opposite sealed edge thereof, turning over the cushion panel and end members, folding back the sealed edge of said end member to a point located substantially one-half the length of the uppermost side member, effecting a seal between the coinciding edges of said end member and the lowermost side member and along an inwardly extending arcuate path beginning at one outer corner of the end member and terminating at the other outer corner thereof, sealing the transverse edges of said cushion panel to the respective end members, and trimming off those portions of said end and side members protruding outwardly from said arcuate seals.

8. The method of constructing a device of the character disclosed comprising the steps of sealing side members to the longitudinal edges of a bottom sheet respectively, sealing the opposite edges of a pair of end members to the corresponding transverse edges respectively of said side members, the seals between the end and side members being applied along inwardly extending arcuate paths, trimming off those portions of said end and side members which extend outwardly from the arcuate seals, sealing the transverse edges of said bottom sheet to the corresponding end members, joining together the corresponding edges of said end and side members with a continuous seal, whereby a pneumatic body is formed which supports said bottom sheet, and providing an opening in said pneumatic body for the passage of air thereinto.

ABRAHAM N. SPANEL.

REFERENCES CITED

The following references are of record in the file of this patent:

UNITED STATES PATENTS

| Number | Name | Date |
| --- | --- | --- |
| 1,625,810 | Krichbaum | Apr. 26, 1927 |
| 1,658,008 | Raiche | Jan. 31, 1928 |
| 1,853,013 | Brady | Apr. 5, 1932 |
| 1,920,961 | Anderson | Aug. 8, 1933 |
| 1,970,803 | Johnson | Aug. 21, 1934 |
| 2,323,629 | Spanel | July 6, 1943 |
| 2,408,789 | Luisada | Oct. 8, 1946 |